United States Patent [19]
Pawelzik et al.

[11] Patent Number: 6,116,279
[45] Date of Patent: Sep. 12, 2000

[54] SEAL SYSTEM FOR WATER-VALUE CARTRIDGE

[75] Inventors: Manfred Pawelzik, Soest; Horst Titze, Hagen; Manfred Graf, Iserlohn, all of Germany

[73] Assignee: Friedrich Grohe AG & Co. KG, Hemer, Germany

[21] Appl. No.: 09/260,981

[22] Filed: Mar. 1, 1999

[30] Foreign Application Priority Data

Mar. 13, 1998 [DE] Germany .............................. 198 11 099

[51] Int. Cl.$^7$ .................................................. F16K 11/074
[52] U.S. Cl. .................. 137/625.4; 137/316; 137/625.17
[58] Field of Search .................. 137/625.4, 316, 137/625.17

[56] References Cited

U.S. PATENT DOCUMENTS 4,921,016  5/1990  Gnauert .
5,060,692  10/1991  Pawelzik et al. ..................... 137/625.4
5,794,650  8/1998  Nikolayczik .......................... 137/454.2

*Primary Examiner*—John Fox
*Attorney, Agent, or Firm*—Herbert Dubno; Andrew Wilford

[57] ABSTRACT

A valve cartridge has a hollow housing having an open end, a floor plate closing the open end and formed with a plurality of throughgoing ports each having an inner surface, a valve plate in the housing fixed atop the floor plate and formed with holes aligned with the floor-plate ports, a movable valve plate in the housing atop the fixed valve plate and formed with a cavity, and an actuating element connected to the movable valve plate for displacing the movable valve plate on the fixed plate and shifting the cavity into and out of engagement with the fixed-plate holes so that if one of the holes is supplied with water under pressure the actuating element can control flow from the one hole to the other hole. Respective annular seal rings made of an elastomeric plastic are received in the ports, formed in situ in the ports, and have outer surfaces bonded to the inner surfaces of the respective ports. The floor plate is made of a material that can bond to and slide relative to the plastic of the seal rings.

10 Claims, 2 Drawing Sheets

SEAL SYSTEM FOR WATER-VALUE CARTRIDGE

FIELD OF THE INVENTION

The present invention relates to a water valve. More particularly this invention concerns a seal system for the inlet and/or outlet ports of a valve cartridge of such a valve.

BACKGROUND OF THE INVENTION

A standard valve cartridge has a cup-shaped housing whose end is closed by a floor plate formed with a plurality of ports, typically hot- and cold-water inlet ports and a mixed-water outlet port. Sitting atop the floor plate is a fixed valve disk having throughgoing holes matching the floor-plate ports, and sitting atop this fixed valve disk is a movable valve disk having at least one downwardly open cavity. The movable valve disk can be shifted so its cavity overlaps some or all of the holes in the fixed valve plate. A lever assembly attached to the movable valve disk and to the housing is normally displaced in one direction to vary the mix of hot and cold water fed to the outlet port and in another direction to vary the volume of flow.

As described in U.S. Pat. No. 4,921,016 of Gnauert, it is standard to fit the floor-plate ports with elastomeric seal rings. These rings are made separately and must be meticulously fitted to the ports and retained in place while the cartridge itself is installed in a valve.

In order to simplify this process, U.S. Pat. No. 4,856,556 of Mennigmann proposes a complex seal that has a pair of lips that fit against opposite faces of the floor plate and the seal is itself vulcanized to the floor plate. Thus this seal is solidly locked to the floor plate and cannot fall out during installation. Nonetheless during high-pressure use the structure loosens and frequently leaks.

OBJECTS OF THE INVENTION

It is therefore an object of the present invention to provide an improved seal assembly for a valve cartridge.

Another object is the provision of such an improved seal assembly for a valve cartridge which overcomes the above-given disadvantages, that is which is of simple construction, which stays in place during assembly of the valve, and which does not leak even when used in high-pressure applications.

SUMMARY OF THE INVENTION

A valve cartridge has according to the invention a hollow housing having an open end, a floor plate closing the open end and formed with a plurality of throughgoing ports each having an inner surface, a valve plate in the housing fixed atop the floor plate and formed with holes aligned with the floor-plate ports, a movable valve plate in the housing atop the fixed valve plate and formed with a cavity, and an actuating element connected to the movable valve plate for displacing the movable valve plate on the fixed plate and shifting the cavity into and out of engagement with the fixed-plate holes so that if one of the holes is supplied with water under pressure the actuating element can control flow from the one hole to the other hole. Respective annular seal rings made of an elastomeric plastic are received in the ports, formed in situ in the ports, and have outer surfaces bonded to the inner surfaces of the respective ports. The floor plate is made of a material that can bond to and slide relative to the plastic of the seal rings.

Forming the ring seals in situ on the floor plate ensures that they bond at least weakly to it so that they will stay in place during subsequent handling and installation of the cartridge. If subsequently the relatively soft seal rings separate from the much harder floor plate, they can slide on it without leakage.

The seal rings in accordance with the invention are made of silicone rubber and the floor plate is made of polyoximethylene or polyamide. In addition respective stiff retaining plastic sleeves are received coaxially snugly inside the seal rings. These sleeves which are also made of polyoximethylene hold the seal rings tightly in place.

Each port has a small-diameter inner portion and a large-diameter outer portion and the respective seal rings have complementary thin inner regions and thick outer regions so as to fit complementarily in the respective ports. In addition each port has a frustoconical shoulder separating its inner and outer portions and each inner portion has measured parallel to a center axis of the respective port an axial dimension equal to between ½ and ⅓ of an axial thickness of the floor plate. Each seal ring has at its thin inner region a thickness equal to about 0.75 of its thickness at its thick outer region and the seal rings have rounded inner and outer ends. More particularly each outer region is stepped and has an outermost portion projecting past a respective face of the floor plate and having a thickness equal to about 0.85 of the adjacent outer region. The retaining sleeves each have a thickness equal to about ⅛ of the thickness of the outer region and an axial length equal to an axial length of an inner surface of the respective seal ring.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
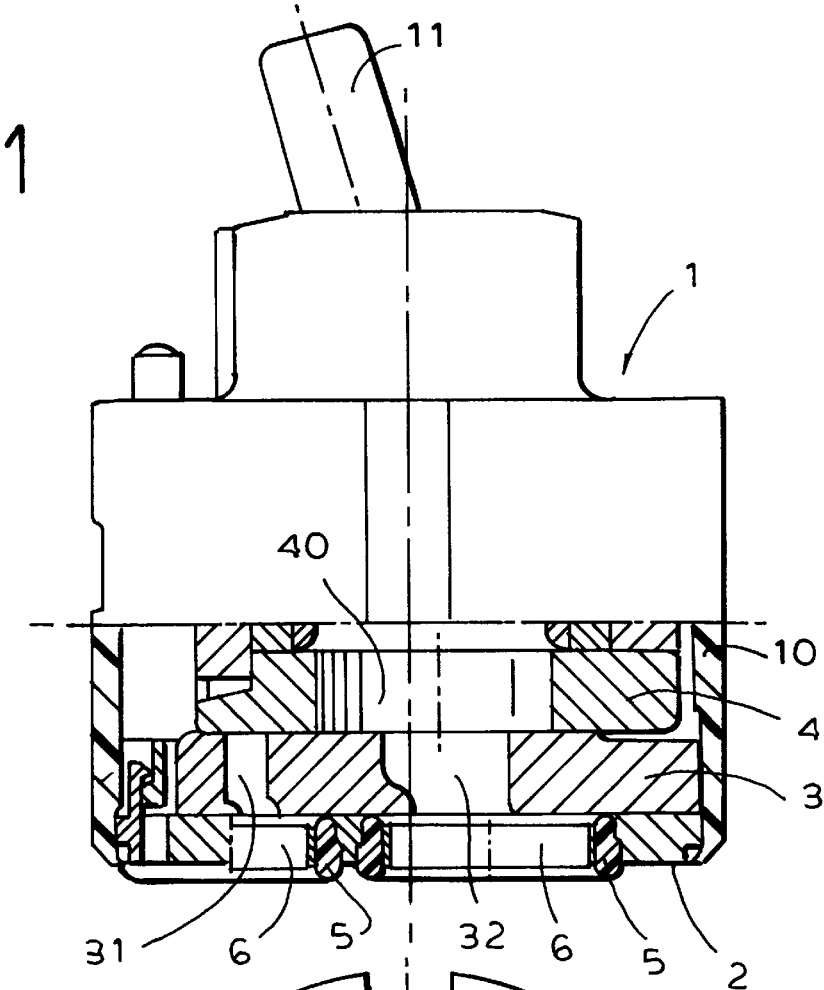
FIG. 1 is a side view partly in vertical section through a valve according to the invention.
Figure 2:
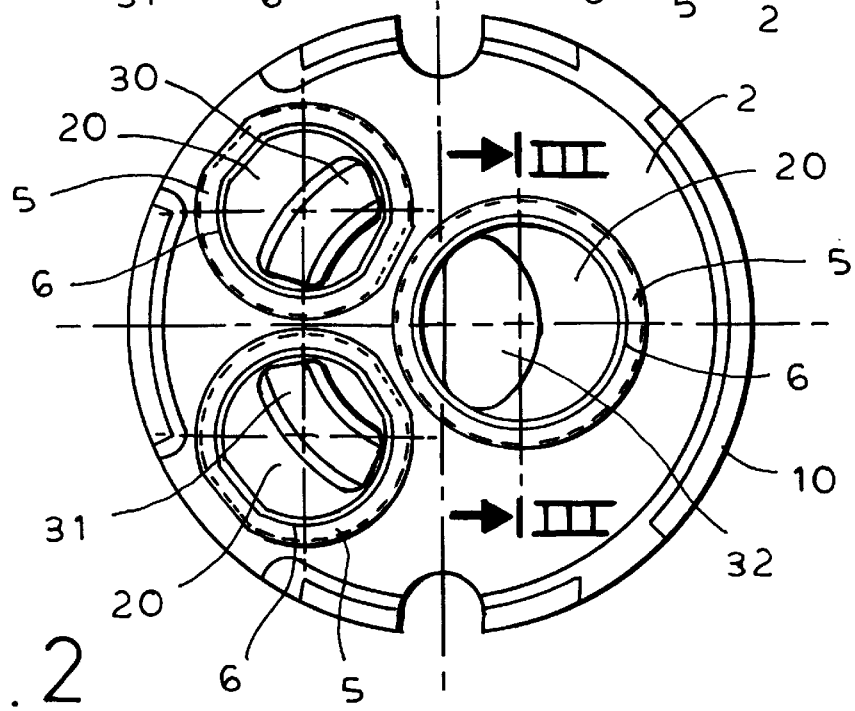
FIG. 2 is a bottom view of the valve of FIG. 1.

As seen in FIGS. 1 and 2 a valve cartridge 1 according to the invention has a cylindrical and cup-shaped internally stepped housing 10 that is normally secured by unillustrated bolts to a planar base plate and in which is fixed a flat plastic floor plate 2 formed with three ports 20. Lying atop the plastic floor plate 2 is a fixed ceramic valve disk 3 formed with three throughgoing holes 30, 31, and 32 that open into the ports 20. Atop the fixed ceramic disk 3 is a movable ceramic disk 4 formed with a central cavity 40 that can be aligned with the holes 30, 31, and 32 and that is moved back and forth and from side to side by a lever 11 in the manner well known in the art. This allows input flow from the holes 30 and 31 that are normally connected to hot- and cold-water lines to be fed in different mixes and at different rates of flow to the port 32 that is normally connected to a faucet or shower head.

Figure 3:
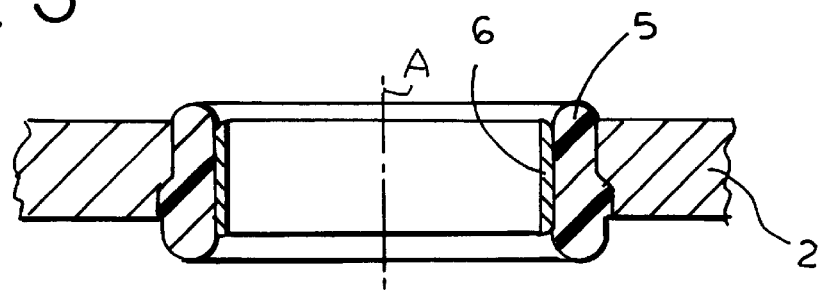
FIG. 3 is a large-scale section taken along line III—III of FIG. 2.
Figure 4:
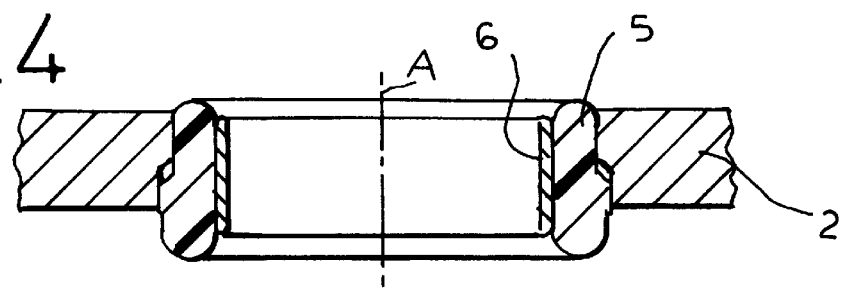
FIG. 4 is a view like FIG. 3 but showing the seal assembly after some use.
Figure 5:
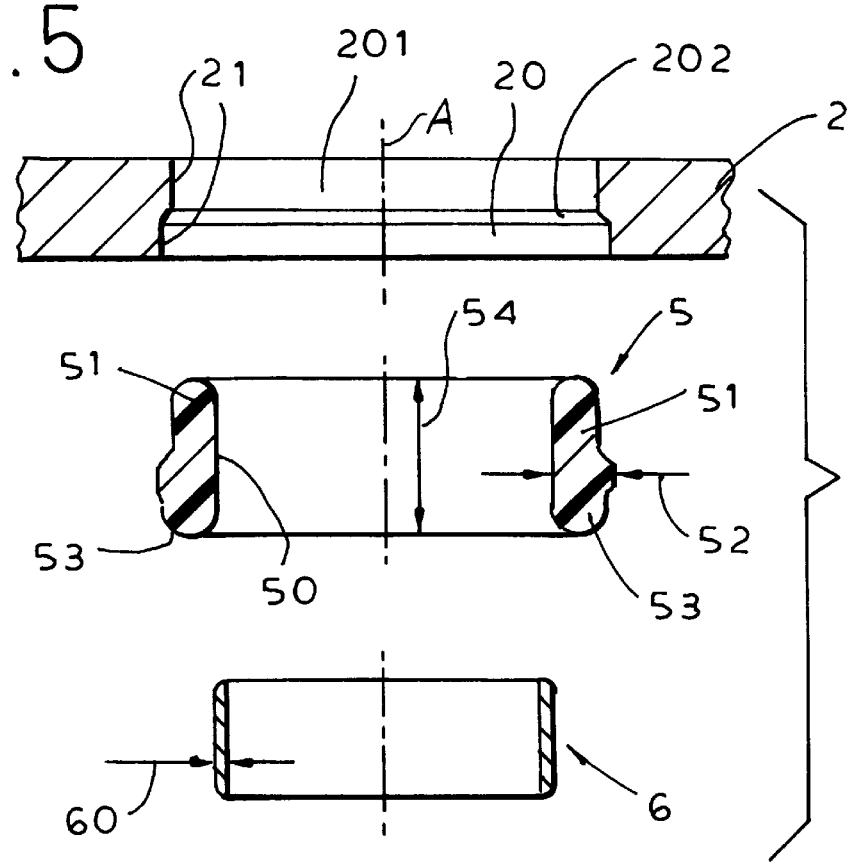
FIG. 5 is an exploded view of the structure of FIGS. 3 and 4.

According to the invention each of the ports 20 has as shown in FIGS. 3 through 5 an inner wall 21 subdivided into a small-diameter cylindrical inner portion 201, a frustoconical middle portion 202, and a large-diameter cylindrical outer portion 203, all centered on a common axis A. An elastomeric seal ring 5 is of complementary shape, with a relatively thin inner portion 51, a shoulder 55 that fits with the frustoconical portion 202, and an outer thick portion 53. Prior to assembly, the portions 51 and 53, which are both semi-circularly rounded, project past the respective faces of the plate 2. Inside the elastomeric seal ring 5 is a hard cylindrical retaining sleeve 6.

More particularly, the seal 5 is made of an elastomer, here silicone rubber, the floor plate 2 of polyoximethylene (POM) or polyamide, and the ring 6 also of POM. The small-diameter portion 201 of the port 200 has an axial length equal to between ½ and ⅔ of the axial thickness of the plate 2. The wall thickness of the seal 5 in the portion 51 is about 0.75 of its wall thickness 52 at the shoulder 55 which in turn is about 0.35 of an overall axial length 54 of the seal 5. The inner portion 53 projecting from the port has a thickness equal to about 0.85 of the maximum wall thickness 52. An inner wall surface 50 of the seal 5 is cylindrical from one end to the other and engages the sleeve 6 in surface contact. This sleeve 6 has a thickness 60 equal to about ⅛ of the maximum wall thickness 52.

The seals 5 are each formed in situ right in the plate 2, that is they are each molded right against the inner surfaces 201–203 of the respective ports 20. As a result they are bonded to these surfaces 201–203 so that the seals 5 will be solidly mounted to the floor plate 2 and will not come loose, even if handled roughly, prior to installation.

After some use, particularly in high-pressure applications, the rings 5 might come unstuck from the surfaces 201–203 and shift axially as shown in FIG. 4. This however will not lead to any leakage. Thus by the fact that the materials of the two parts 2 and 5 are compatible enough that they will bond together when formed against each other, but will still permit relative sliding, one has the advantage of easy assembly and subsequent good sealing.

We claim:

1. A valve cartridge comprising:

a hollow housing having an open end;

a floor plate closing the open end and formed with a plurality of throughgoing ports each having an inner surface;

a valve plate in the housing fixed atop the floor plate and formed with holes aligned with the floor-plate ports;

a movable valve plate in the housing atop the fixed valve plate and formed with a cavity;

means including an actuating element connected to the movable valve plate for displacing the movable valve plate on the fixed plate and shifting the cavity into and out of engagement with the fixed-plate holes, whereby if one of the holes is supplied with water under pressure the actuating element can control flow from the one hole to the other hole; and respective annular seal rings made of an elastomeric plastic, received in the ports, formed in situ in the ports, and having outer surfaces weakly bonded to the inner surfaces of the respective ports, the floor plate being made of a material that can both bond to and slide relative to the plastic of the seal rings, whereby when the weak bond between the rings and the floor plate is broken the rings can slide in the ports.

2. The valve cartridge defined in claim 1 wherein the seal rings are made of silicone rubber and the floor plate is made of polyoximethylene or polyamide.

3. The valve cartridge defined in claim 1, further comprising respective stiff retaining plastic sleeves received coaxially snugly inside the seal rings.

4. The valve cartridge defined in claim 3 wherein the sleeves are made of polyoximethylene.

5. The valve cartridge defined in claim 1 wherein each port has a small-diameter inner portion and a large-diameter outer portion and the respective seal rings have complementary thin inner regions and thick outer regions so as to fit complementarily in the respective ports.

6. The valve cartridge defined in claim 5 wherein each port has a frustoconical shoulder separating its inner and outer portions and each inner portion has measured parallel to a center axis of the respective port an axial dimension equal to between one-half and two-thirds of an axial thickness of the floor plate.

7. The valve cartridge defined in claim 5 wherein each seal ring has at its thin inner region a thickness equal to about 0.75 of its thickness at its thick outer region.

8. The valve cartridge defined in claim 5 wherein the seal rings have rounded inner and outer ends.

9. The valve cartridge defined in claim 5 wherein each outer region has an outermost portion projecting past a respective face of the floor plate and having a thickness equal to about 0.85 of the adjacent outer region.

10. The valve cartridge defined in claim 5, further comprising respective stiff retaining plastic sleeves received coaxially snugly inside the seal rings and each having a thickness equal to about ⅛ of the thickness of the outer region and an axial length equal generally to an axial length of an inner surface of the respective seal ring.

* * * * *